Sept. 15, 1964
J. D. GIULIE
WEIGHING CELL
3,148,742
Filed Feb. 2, 1962
3 Sheets-Sheet 1
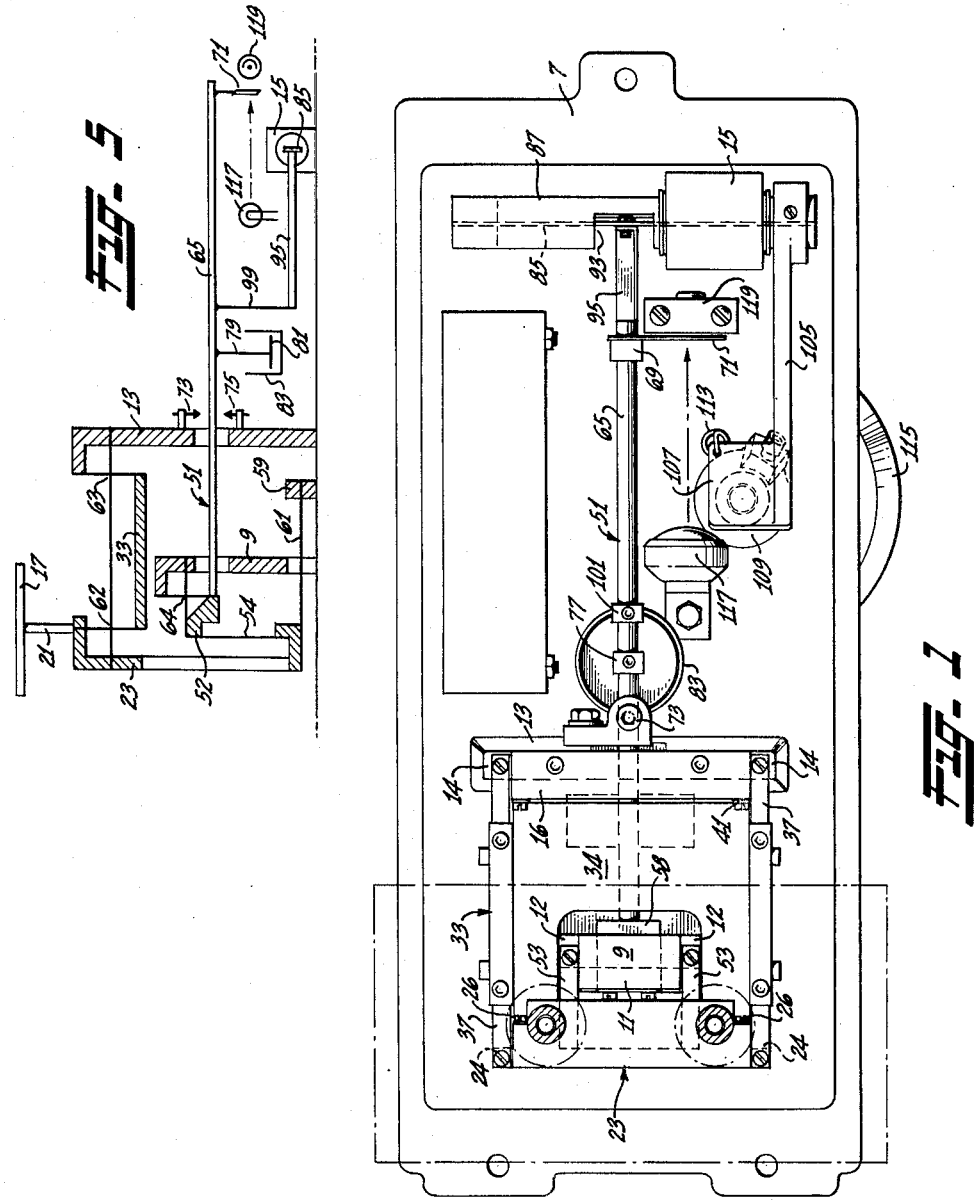
INVENTOR:
JOE D. GIULIE
BY
ATTORNEYS Sept. 15, 1964
J. D. GIULIE
3,148,742
WEIGHING CELL
Filed Feb. 2, 1962
3 Sheets-Sheet 2
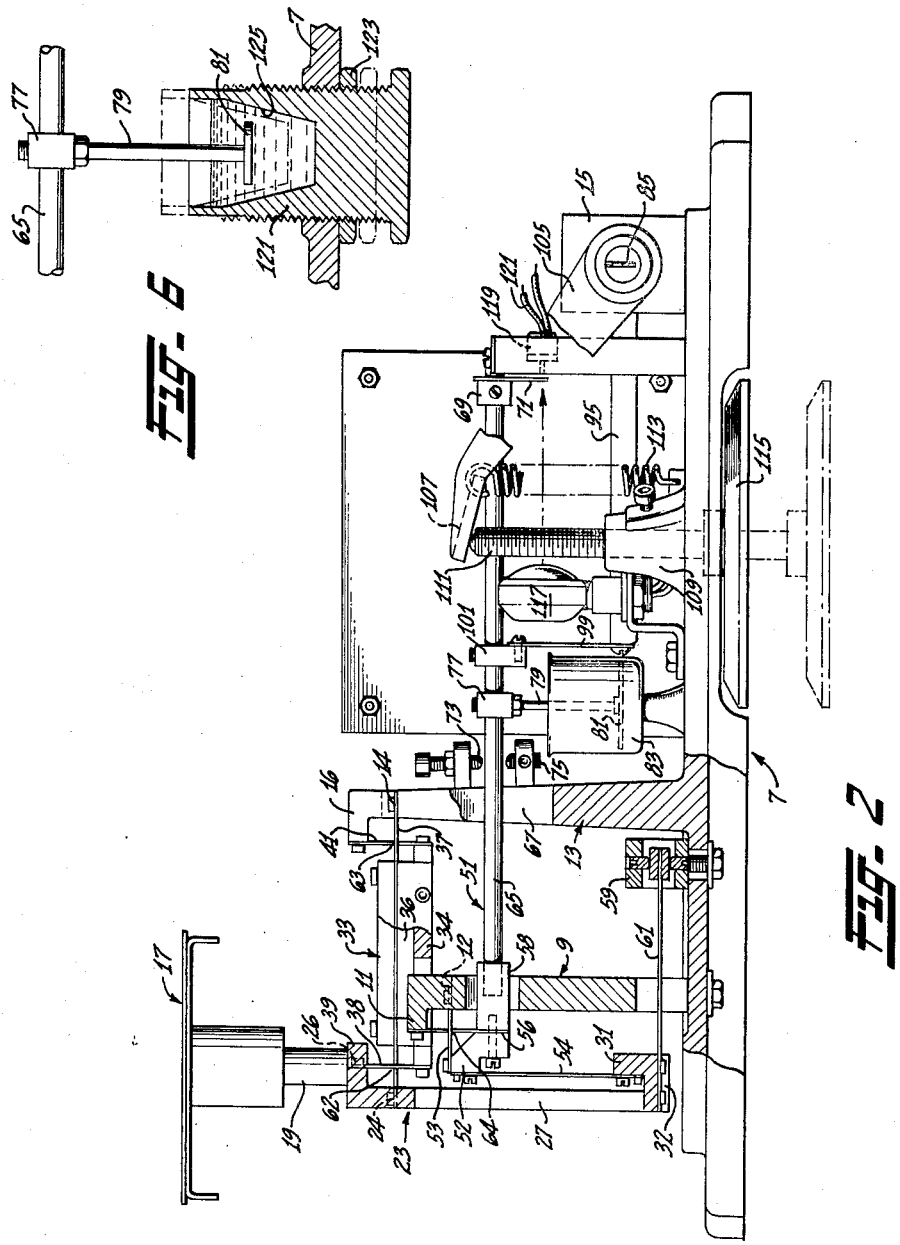
INVENTOR:
JOE D. GIULIE
BY
ATTORNEYS Sept. 15, 1964    J. D. GIULIE    3,148,742
WEIGHING CELL
Filed Feb. 2, 1962    3 Sheets-Sheet 3
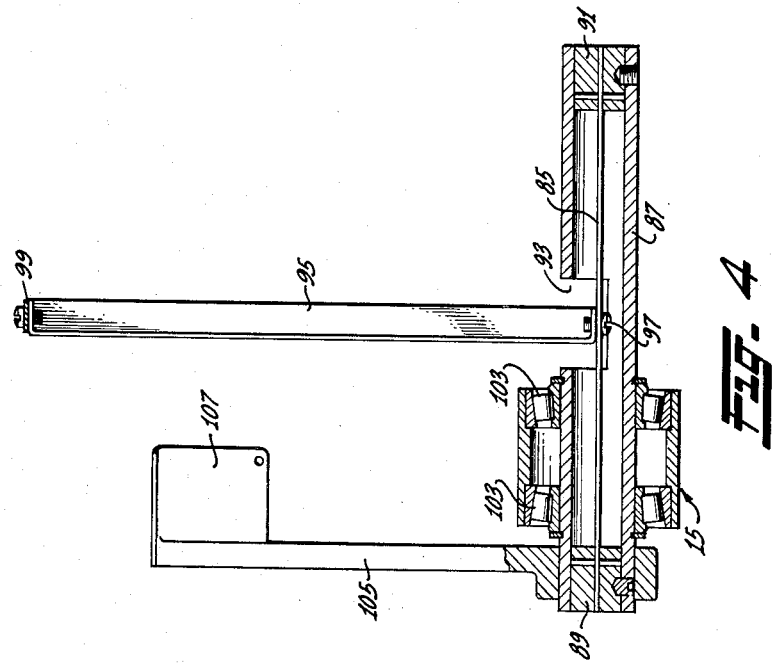
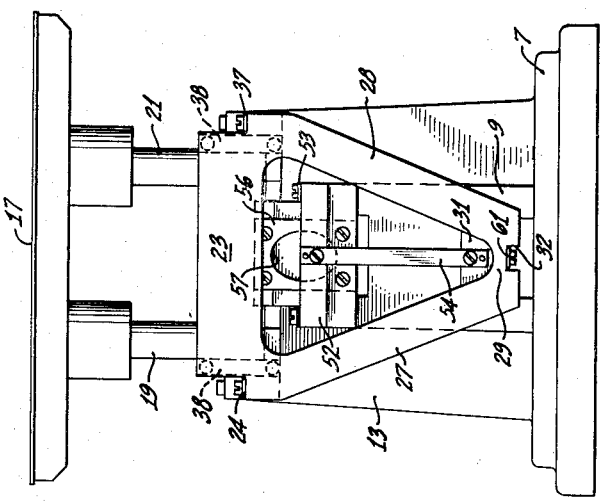
INVENTOR:
JOE D. GIULIE
BY
ATTORNEYS

United States Patent Office 3,148,742
Patented Sept. 15, 1964

3,148,742
WEIGHING CELL
Joe D. Giulie, Los Altos Hills, Calif., assignor to Illumitronic Systems Corporation, a corporation of California
Filed Feb. 2, 1962, Ser. No. 170,665
4 Claims. (Cl. 177—46)

This invention relates to a scale mechanism and more particularly relates to a weighing cell suitable for use in a high speed automatic scale wherein articles are weighed and are automatically passed or rejected depending upon whether they are within a certain tolerance of the correct weight.

In accordance with the present invention, a weighing cell is provided which is capable of high speed operation with extreme accuracy. Thus, the weighing cell of the present invention is adapted to weigh up to 300 separate articles per minute, which articles may weigh as much as 10 pounds, and to pass or reject articles based on weight differences as little as 1/30 of an ounce from the set standard.

Generally speaking, these objectives are achieved in a novel weighing cell wherein the pan of the scale is not supported by conventional bearings but wherein the movement of the scale pan takes place over crossed thin steel members, hereinafter sometimes referred to as cross flexes. Further, movement of the pan is extremely limited and normally is from 0.0025 to 0.003 inch. The amount of movement is independent of the weight on the pan, i.e. preloading determines whether or not it will move but if it moves at all it will move through the entire limited movement. This movement is amplified and the result is sensed by a photoelectric cell, the movement of the beam at the photoelectric cell being about 0.04 inch. Further, the weighing unit itself comprises a torsion member, thus eliminating the speed limitations which are found in balanced ratio systems wherein a substantial amount of intertia prevents the scale from rapidly coming to rest.

In the drawings forming a part of this application:
FIGURE 1 is a plan view of the novel weighing cell embodying the present invention.
FIGURE 2 is a side elevation, partially in section, of the cell shown in FIGURE 1.
FIGURE 3 is a front elevation of the cell shown in FIGURE 1.
FIGURE 4 is a view, partially in section, of the torsion bar and torsion bar mounting which are used in the present invention.
FIGURE 5 is a schematic diagram on a reduced scale to show the operation of the weighing cell.
FIGURE 6 is a view, partially in section of an alternate configuration of a part of the invention.

Referring now to the drawings by reference characters, the weighing cell embodies a base member indicated generally by the numeral 7 having mounted thereon a forward pillar 9 and a second larger pillar 13 for supporting the weighing apparatus. A torsion member support block 15 is mounted on base 7 toward the opposite end. The pillar 9 is of generally A shape having an upper aperture to provide clearance for the scale beam and a cut out at the bottom for a horizontal flex member. The top of pillar 9 is formed with a forwardly extending portion 11 and a pair of opposed shoulders 12 which provide for attachment of vertical and horizontal flex members respectively.

Pillar 13 also has an upper aperture to permit the free movement of the scale beam and incorporates a pair of shoulders 14 for attachment of horizontal flexes. A transverse angle member 16 is mounted on top of pillar 13 to provide an offset mounting for a pair of vertical flexes. A scale pan 17 is mounted on two spaced vertical posts 19 and 21 affixed to triangularly-shaped, vertical disposed scale support member 23. The upper portion of member 23 is provided with a pair of outwardly extending shoulders 24 for mounting horizontal flexes and a second pair of shoulders 26 for mounting vertical flexes. Support member 23 is formed with downwardly converging legs 27 and 28 joined at 29 and has an offset, upwardly extending lip 31 for attaching a vertical flex. A groove 32 at the bottom provides for mounting a horizontal flex. Threaded, tapped holes are provided in the shoulders, offsets and groove to receive bolts affixing the ends of the cross flexes as shown.

An intermediate connecting plate assembly 33 is disposed between the top portion of pillar 13 and the upper part of vertical member 23 to serve as an aligning guide for the cooperating moving elements of the scale. Assembly 33 comprises a generally U-shaped horizontal plate 34 having a pair of spaced, upstanding curbs 36 along each side to which are affixed a pair of longitudinally extending flexes 37 affixed to shoulders 14 on pillar 13 and shoulders 24 on member 23. A pair of vertical flexes 38 connect the forward end of assembly 33 to the rearwardly projecting lip 39 on member 23 and a second pair of vertical flexes 41 are fastened between the rear end of assembly 33 and the transverse angle member 16.

The beam of the scale, generally designated 51, has mounted at its forward end an angular transverse hanger element 52 providing for mounting a pair of spaced horizontal flexes 53 and a single vertical flex 54, affixed at its lower end to lip 31 on member 23. A flex member 56 of generally rectangular shape and having an opening 57 therethrough is bolted between hanger 52 and a mounting block 58. An adjustable clamp assembly 59 is fastened to the base member 7 just forward of pillar 13 and serves to anchor one end of a centrally disposed horizontal flex member 61 affixed to the bottom of support member 23.

The actual suspension of scale pan 17 is thus achieved by the use of a plurality of cross-flexed, thin steel members so that deflection of the scale pan does not result in the usual movement of a bearing but rather results in the very slight flexure of the flexible steel members. It will be noted that assembly 33 is linked to the scale-supporting member 23 by two pairs of cross flexed members at 62 and to the top of pillar 13 by a second set of cross flexes at 63. Similarly, this hanger element 52 is linked to pillar 9 by the pair of flexes 53 and single flex 56 crossed at 64. In addition, element 52 is linked to the lip 31 at the bottom of support member 23 by the single flex member 54. Horizontal flex member 61 links the bottom of member 23 to clamp assembly 59. As can best be seen by the schematic diagram of FIGURE 5, the point of rotation of the scale-holding mechanism is thus around the juncture of the cross flexes 64. Naturally, the amount of movement provided by such cross flexes is relatively limited, i.e. on the order of a few thousandths of an inch, but the movement takes place with an extremely small amount of friction.

The beam of the scale, which is generally designated 51, comprises a rod 65 which extends through the aperture 67 in the upright 13 and terminates in a flag-holding member 69 having a flag 71 thereon. The threaded members 73 and 75 limit the movement of the beam 51 so that undue strain is not placed in the cross flexes under conditions of no load or over load. The rod 65 also carries a clamp 77 having a piston rod 79 extending therefrom which carries a piston 81 which extends into the dash pot 83. The dash pot 83 is normally partially filled with a silicone liquid and serves to damp out vibrations and enable the scale to assume rapidly a condition of equilibrium.

The actual weighing element of the scale comprises a torsion bar 85 which is suspended in the tube 87 by means of plugs 89 and 91 at opposite ends of the tube. The center of the tube 87 has an opening 93 through which the arm 95 passes. One end of arm 95 is attached to the torsion bar 85 by means of the screw 97 while the opposite end is attached to the rod 65 through link 99 and clamp 101. The block 15 is provided with roller bearings 103 supporting the tube 87. One end of the tube is attached to an arm 105 which terminates in the plate 107. A threaded boss 109 is provided on the base 7 through which the screw 111 extends, one end of which presses against the plate 107 while the opposite end of the screw 111 is provided with a hand wheel 115 so that the tension on the torsion member 85 may be readily adjusted. The spring 113 holds the plate 107 tightly against the end of screw 111.

A light source 117 is provided which casts a beam of light onto the photocell 119. As can be seen from the drawings, light from the source 117 will or will not reach the photocell 119 depending upon the position of the fleg 71. In the device shown, only a single photocell is shown and the scale is adapted to pass articles which are either on the desired weight or above the desired weight. The cell remains dark and thus actuates a reject mechanism when an underweight package is placed on the pan 17. In some instances, it might be desired to make three segregations, such as underweight, on weight or overweight and in some instances five segregations might be desired, such as grossly underweight, underweight, on weight, overweight, and grossly overweight. In such instances, additional photocells can be employed to indicate different beam positions.

To utilize the device, an article of desired weight is placed on the pan 17 and the hand wheel 115 turned to place tension on the torsion member 85 until light barely strikes the photocell 119. Thereafter, if a package of the corect or overweight is placed on the pan, light will strike the photocell, while if an underweight package is placed on the pan, light will not strike the photocell. Current is taken from the photocell by means of wire 121 to a control and reject actuating circuit which forms no part of the present invention.

In FIGURE 6 there is shown an alternate form of dashpot which may advantageously be used with the scale of the present invention. In this embodiment of the invention, the base 7 is threaded to receive a cup 121. A locking nut 123 is provided so that the cup 121 can be locked in any desired position. With conventional dashpots such as that shown in FIGURE 1, it is ordinarily necessary to remove a top cover as well as the piston assembly to get to the dashpot so that it can be cleaned out or the fluid replenished. However, with the structure shown in FIGURE 6 the entire operation can be conducted from outside the device since it is only necessary to loosen the locked nut 123 and remove the cup 121, without disturbing the balance of the mechanism.

In the embodiment shown in FIGURE 6, the inner surface of the cup is tapered as 125. Thus the degree of dampening can be readily controlled by positioning the cup since if the cup is in an elevated position, as is shown in dot-dash lines, the piston 81 will be relatively near the wall of the cup so that there will be a maximum dampening while if the cup is lowered, as is shown in solid lines, there is a relatively large clearance between the piston and the cup so that a relatively small amount of dampening is achieved.

I claim:

1. A weighing cell for use in a high-speed weight classifier comprising a scale pan, means for mounting said scale pan on a beam comprising a plurality of cross flexes, an elongated beam attached to said scale pan, means to limit beam movement, preloading means whereby a weight of less than the preloading will cause no beam movement and weight of more than the preloading amount will cause the beam to move through the entire limited movement and sensing means at the opposite end of said beam to sense the position of the pan.

2. The cell of claim 1 wherein a photoelectric cell is utilized to sense the position of the beam.

3. The cell of claim 1 wherein pan movement is restricted to a few thousandths of an inch.

4. A mounting for a pan on a scale wherein the pan is mounted on cross flexes, each cross flex comprising two thin metal strips mounted at right angles to each other, comprising first and second fixed upright members, a moveable vertical member with a scale pan attached thereto and two spaced moveable horizontal members, a first pair of cross flexes linking said vertical member with each of said horizontal members, a second pair of cross flexes linking the horizontal members, a second pair of cross flexes linking the horizontal members with the second of the fixed upright members, a linkage between the vertical pan supporting member and a scale beam and a pair of cross flexes linking the scale beam to the first fixed upright member.

References Cited in the file of this patent

UNITED STATES PATENTS

| | | |
|---|---|---|
| 340,012 | Springer | Apr. 13, 1886 |
| 849,418 | Nickerson | Apr. 9, 1907 |
| 2,645,447 | Clark | July 14, 1953 |
| 2,883,140 | Stafford | Apr. 21, 1959 |